United States Patent
Nagata et al.

(10) Patent No.: US 8,497,435 B2
(45) Date of Patent: Jul. 30, 2013

(54) CABLE MOUNTING STRUCTURE FOR ELECTRIC APPARATUS

(75) Inventors: Koji Nagata, Tokyo (JP); Yoshitaka Higashi, Tokyo (JP)

(73) Assignee: Meidensha Corporation, Tokyo (JP)

( * ) Notice: Subject to any disclaimer, the term of this patent is extended or adjusted under 35 U.S.C. 154(b) by 162 days.

(21) Appl. No.: 13/001,721

(22) PCT Filed: Jun. 25, 2009

(86) PCT No.: PCT/JP2009/061658
§ 371 (c)(1),
(2), (4) Date: Mar. 9, 2011

(87) PCT Pub. No.: WO2010/001814
PCT Pub. Date: Jan. 7, 2010

(65) Prior Publication Data
US 2011/0180319 A1    Jul. 28, 2011

(30) Foreign Application Priority Data

Jun. 30, 2008 (JP) .................................. 2008-170151

(51) Int. Cl.
*H02G 3/18* (2006.01)
(52) U.S. Cl.
USPC .............. 174/650; 174/152 G; 174/153 G; 174/659; 16/2.1; 16/2.2; 248/56
(58) Field of Classification Search
USPC ............ 174/650, 152 G, 153 G, 152 R, 652, 174/50, 50.5, 520, 659, 663, 137 R, 135; 16/2.1, 16/2.2; 248/56; 220/3.2, 3.3, 4.02
See application file for complete search history.

(56) References Cited

U.S. PATENT DOCUMENTS

| | | | |
|---|---|---|---|
| 5,378,174 A * | 1/1995 | Brownlie et al. | ............. 174/652 |
| 6,265,670 B1 * | 7/2001 | Duesterhoeft et al. | .... 174/152 G |
| 6,362,421 B1 * | 3/2002 | Layton, Jr. | ...................... 174/50 |

(Continued)

FOREIGN PATENT DOCUMENTS

| JP | 3-063986 | 6/1991 |
|---|---|---|
| JP | 06-058537 | 3/1994 |

(Continued)

OTHER PUBLICATIONS

International Search Report mailed Jul. 21, 2009 in PCT/JP2009/061658.

*Primary Examiner* — Angel R Estrada
(74) *Attorney, Agent, or Firm* — Foley & Lardner LLP

(57) ABSTRACT

A cable mounting structure for an electric apparatus is provided which ensures sealing properties, such as waterproof properties and dustproof properties, and which can effectively contribute to downsizing, while easing restrictions on the size of a connecting tool mounted on one end of a cable connected to an electric apparatus body. The cable mounting structure comprises a housing (10) for accommodating an electric apparatus body, a cable (11) connected to the electric apparatus body via a second connector (12) or the like, a grommet (20) mounted on the cable (11), a recessed housing section (15) provided in the housing (10), and a lid (30) for closing the recessed housing section. The recessed housing section is formed in a closed-bottomed tubular shape recessed inwardly of the housing. A grommet mounting hole for fixing the grommet (20) thereto is formed in a peripheral wall section (15*a*) of the recessed housing section, and a pass-through section (31) through which the cable is passed is formed in the lid. The connecting tool is disposed within the recessed housing section, and the pass-through section is positioned to the grommet.

10 Claims, 5 Drawing Sheets

U.S. PATENT DOCUMENTS

| | | | |
|---|---|---|---|
| 6,867,371 B2 * | 3/2005 | Daoud et al. | 248/56 |
| 7,355,130 B2 * | 4/2008 | Holman et al. | 174/152 G |
| 7,781,678 B2 * | 8/2010 | Reed et al. | 174/153 G |
| 7,781,684 B2 * | 8/2010 | Stuckmann et al. | 174/650 |
| 8,033,408 B2 * | 10/2011 | Makela et al. | 174/152 G |
| 2011/0290520 A1 * | 12/2011 | Nishimura | 174/50.5 |

FOREIGN PATENT DOCUMENTS

| | | |
|---|---|---|
| JP | 2002-369346 | 12/2002 |
| JP | 2003-134643 | 5/2003 |

* cited by examiner

CABLE MOUNTING STRUCTURE FOR ELECTRIC APPARATUS

TECHNICAL FIELD

This invention relates to a cable mounting structure for an electric apparatus.

BACKGROUND ART

An electric apparatus is required to have waterproof properties and dustproof properties in order to prevent a failure or a malfunction in the electric apparatus itself which may occur depending on an environment where it is used. As a method for fulfilling such a requirement, there is adopted, for example, a technique in which an electric apparatus body is accommodated within a closed or sealed housing. Even with such a technique, the electric apparatus body accommodated in the housing needs to be connected to the outside of the housing with the use of a cable, with the aim of supplying electric power from outside to the electric apparatus body, or transmitting and receiving control signals and data signals for the electric apparatus body. For this purpose, a cable mounting structure for the electric apparatus is also required to have waterproof properties and dustproof properties. Technologies for fitting a grommet over the cable, and mounting the grommet on the housing in an intimately contacted state have been developed (see, for example, Patent Documents 1 and 2).

In connection with the electromechanical device described in Patent Document 1, the application of a cable mounting structure to a motor (electric rotating machine) will be concretely described with reference to FIG. 5.

As shown in FIG. 5, an electric rotating machine (stator and rotor) 101, which is an electric apparatus body of a motor, is accommodated within a housing 102. If the electric rotating machine 101 is accommodated within the housing 102 in this manner, there are restrictions in the diametrical direction within the housing 102. Thus, a cable mounting structure 120 for the electric apparatus designed to mount a cable 111 is provided at one end 102a of the housing 102. A grommet 114 is mounted on the cable 111, and connectors 112, 113 are attached to both ends of the cable 111. The cable mounting structure 120 for the electric apparatus is furnished with a fixing section 121 provided to protrude from the one end 102a of the housing 102, and a lid 122 for closing the fixing section 121. The fixing section 121 has a protruding portion 121a continuous with a peripheral wall section 102b of the housing 102 and extending in the same direction as the axis C10 of the housing 102, and a side wall portion 121b continuous with the protruding portion 121a and extending toward the axis C10 of the housing 102. One of the connectors, 112, is disposed within the housing 102, while the other connector 113 is disposed outside the housing 102. The grommet 114 is placed on the side wall portion 121b of the fixing section 121, and rendered stationary by the lid 122, whereby the waterproof properties and dustproof properties of the cable mounting structure 120 for the electric apparatus are ensured.

The mounting structure for an electric component described in Patent Document 2 will be concretely described with reference to FIG. 6.

As shown in FIG. 6, an electric apparatus body (not shown) is accommodated within a housing 201. A through-hole 202 is provided in the housing 201, and a cable 211 is mounted at this site. Connectors 212, 213 are attached to both ends of the cable 211, and a rubber bushing 215 is provided to have the cable 211 inserted therethrough. Through this through-hole 202, one of the connectors, 212, is disposed within the housing 201, and the other connector 213 is disposed outside the housing 201. The rubber bushing 215 is mounted in the through-hole 202, whereby the waterproof properties and dustproof properties of the cable mounting structure for the electric apparatus are ensured.

PRIOR ART DOCUMENTS

Patent Documents

Patent Document 1: JP-A-2002-369346
Patent Document 2: JP-A-06-58537

SUMMARY OF THE INVENTION

Problems to be Solved by the Invention

With the electromechanical device having the mounting structure applied to the motor mentioned above, however, the lid 122 has to be disposed parallel to the cable 111, and the fixing section 121 for fixing the lid 122 is provided outside the housing 102. Thus, it has been difficult to achieve downsizing.

With the aforementioned mounting structure for the electrical component, the size of the connector 212 which can be disposed within the housing 201 is restricted by the size of the through-hole 202. That is, if the connector 212 is of a large shape, the through-hole 202 becomes large according to the size of the connector 212, and the rubber bushing 215 for closing the through-hole 202 also becomes large in size. As a result, downsizing has been difficult to achieve.

The present invention has been proposed in the light of the above-mentioned problems. It is an object of the invention to provide a cable mounting structure for an electric apparatus, which ensures sealing properties, such as waterproof properties and dustproof properties, and which can effectively contribute to downsizing, while easing restrictions on the size of a connecting tool mounted on one end of a cable connected to an electric apparatus body.

Means for Solving the Problems

A cable mounting structure for an electric apparatus according to a first aspect of the invention, intended for solving the above problems, is a cable mounting structure for an electric apparatus, comprising a housing for accommodating an electric apparatus body, a cable connected to the electric apparatus body via a connecting tool, a grommet mounted on the cable, a recessed section provided in the housing, and a lid for closing the recessed section, wherein the recessed section is formed in a closed-bottomed tubular shape recessed inwardly of the housing, a fixing section for fixing the grommet thereto is provided in a peripheral wall section of the recessed section, and a pass-through section through which the cable is passed is provided in the lid, and the connecting tool is disposed within the recessed section, and the pass-through section is positioned to the grommet.

A cable mounting structure for an electric apparatus according to a second aspect of the invention, intended for solving the above problems, is the cable mounting structure for an electric apparatus according to the first aspect of the invention, wherein the pass-through section has a communicating portion communicating with an edge of the lid, and the fixing section has a communicating section communicating with the peripheral wall section of the recessed section.

A cable mounting structure for an electric apparatus according to a third aspect of the invention, intended for solving the above problems, is the cable mounting structure for an electric apparatus according to the second aspect of the invention, wherein the communicating portion in the pass-through section and the communicating section in the fixing section are formed to be offset with respect to each other.

Effects of the Invention

With the cable mounting structure for an electric apparatus according to the present invention, the recessed section is formed in a closed-bottomed tubular shape recessed inwardly of the housing, the fixing section for fixing the grommet mounted on the cable is provided in the peripheral wall section of the recessed section, and the pass-through section through which the cable is passed is provided in the lid, and the connecting tool is disposed within the recessed section, and the pass-through section is positioned to the grommet. Thus, the sealing properties such as waterproof properties and dustproof properties can be ensured. Regardless of the size of the pass-through section, the connecting tool can be disposed within the recessed section, and restrictions on the size of the connecting tool can be eased. Furthermore, the grommet and the connecting tool can be disposed within the recessed section of the housing. Thus, this configuration can effectively contribute to downsizing.

With the cable mounting structure for an electric apparatus according to the present invention, the pass-through section has the communicating portion communicating with the edge of the lid, and the fixing section has the communicating section communicating with the peripheral wall section of the recessed section. Thus, the sealed state of the recessed section by the lid can be ensured more reliably. Moreover, the grommet can be easily fixed to the fixing section, and the pass-through section can be easily positioned to the grommet. Furthermore, the structure is so simple that an increase in the production cost can be curtailed.

With the cable mounting structure for an electric apparatus according to the present invention, the communicating portion in the pass-through section and the opening section in the fixing section are formed to be offset with respect to each other. Thus, the sealed state of the recessed section by the lid can be ensured even more reliably.

MODE FOR CARRYING OUT THE INVENTION

A mode for putting into practice a cable mounting structure for an electric apparatus according to the present invention will be described concretely based on an embodiment of the invention.

Embodiment 1

A cable mounting structure for an electric apparatus according to a first embodiment of the present invention will be described by reference to FIGS. 1 to 4.

Figure 1:
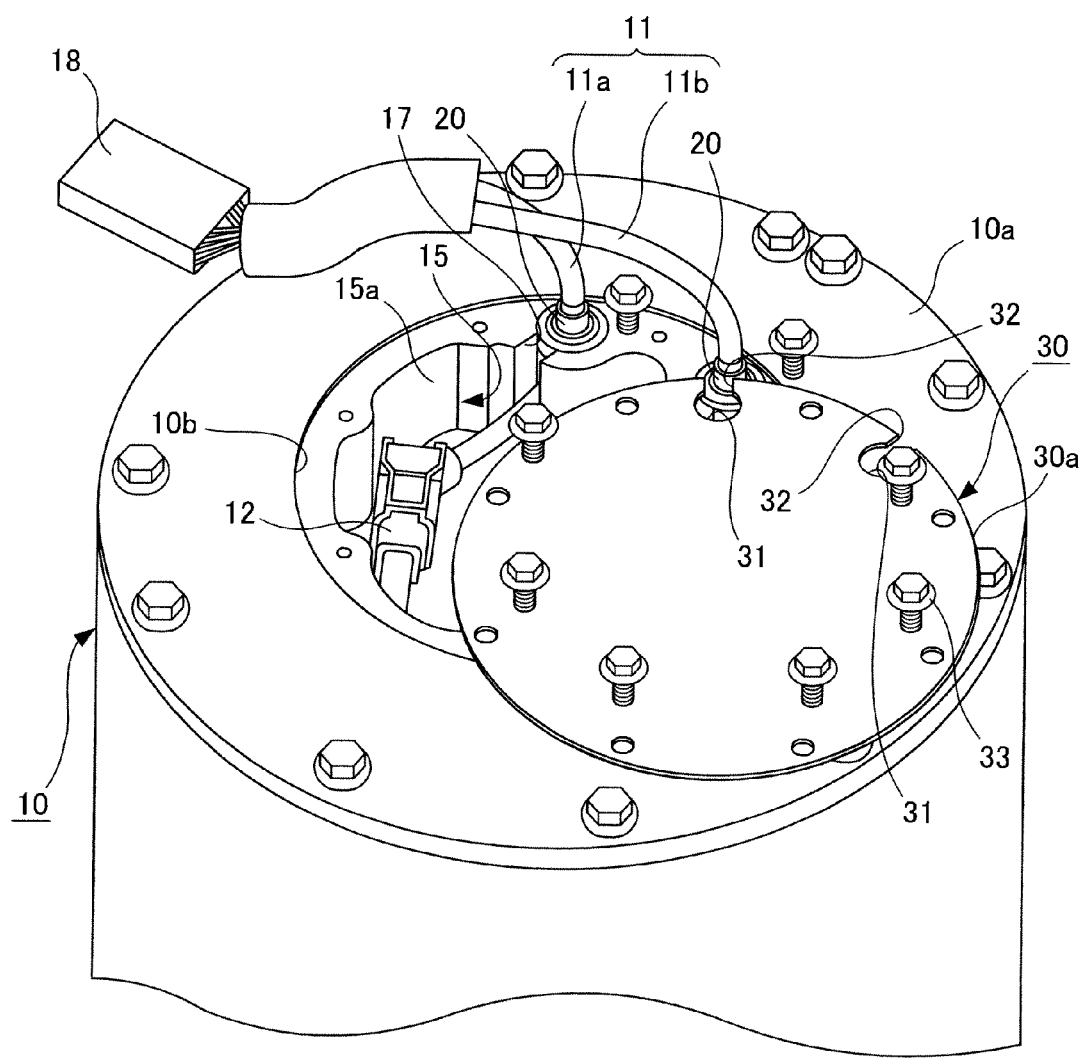
FIG. 1 is a schematic view of a cable mounting structure for an electric apparatus according to a first embodiment of the present invention.

The cable mounting structure for an electric apparatus according to the first embodiment of the present invention, as shown in FIG. 1, is a cable mounting structure for an electric apparatus, adapted to mount a cable 11, which connects an electric apparatus body 1 to the outside of a nearly cylindrical housing 10 for accommodating the electric apparatus body 1, to the housing 10. The cable mounting structure is provided on one end 10a of the housing 10. As the electric apparatus body 1, there is named the one required to have waterproof properties and dustproof properties depending on an environment for its use, for example, an electric rotating machine having a stator and a rotor.

The cable 11 has a first cable 11a and a second cable 11b. The first cable 11a has one end (end facing the electric apparatus body 1) to which a first connector 12 (connecting tool) is attached, and has the other end to which a second connector 18 (connecting tool) is attached. The second cable 11b has one end (end facing the electric apparatus body 1) to which a third connector (connecting tool; not shown) is attached, and has the other end to which the second connector 18 is attached. The first cable 11a and the second cable 11b pass through grommets 20, and the first cable 11a and the second cable 11b are mounted through the grommets 20. Examples of the first cable 11a and the second cable 11b are a power supply cable for supplying electricity to the electric apparatus body 1, and a signal cable for transmission and reception of a control signal and a data signal between the electric apparatus body 1 and the outside.

Figure 2A:
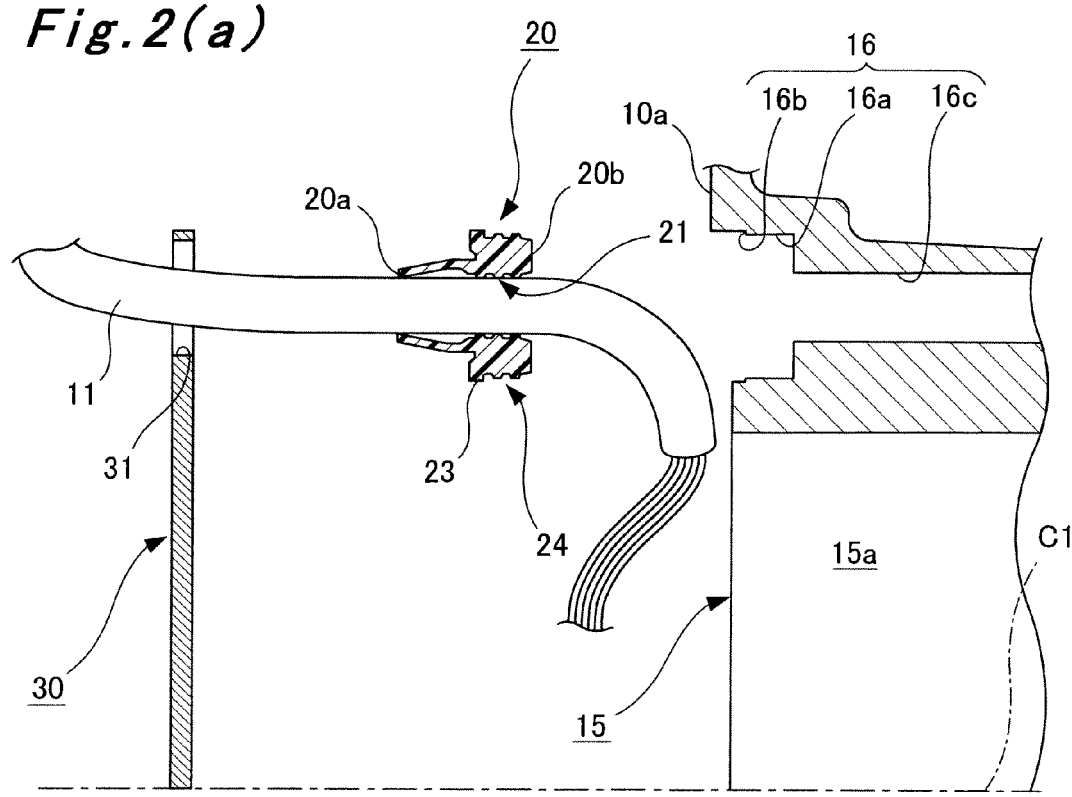
FIGS. 2(a) and 2(b) are views for illustrating the cable mounting structure for an electric apparatus according to the first embodiment of the present invention, FIG. 2(a) showing a disassembled state of the cable mounting structure, and FIG. 2(b) showing its assembled state.
Figure 2B:
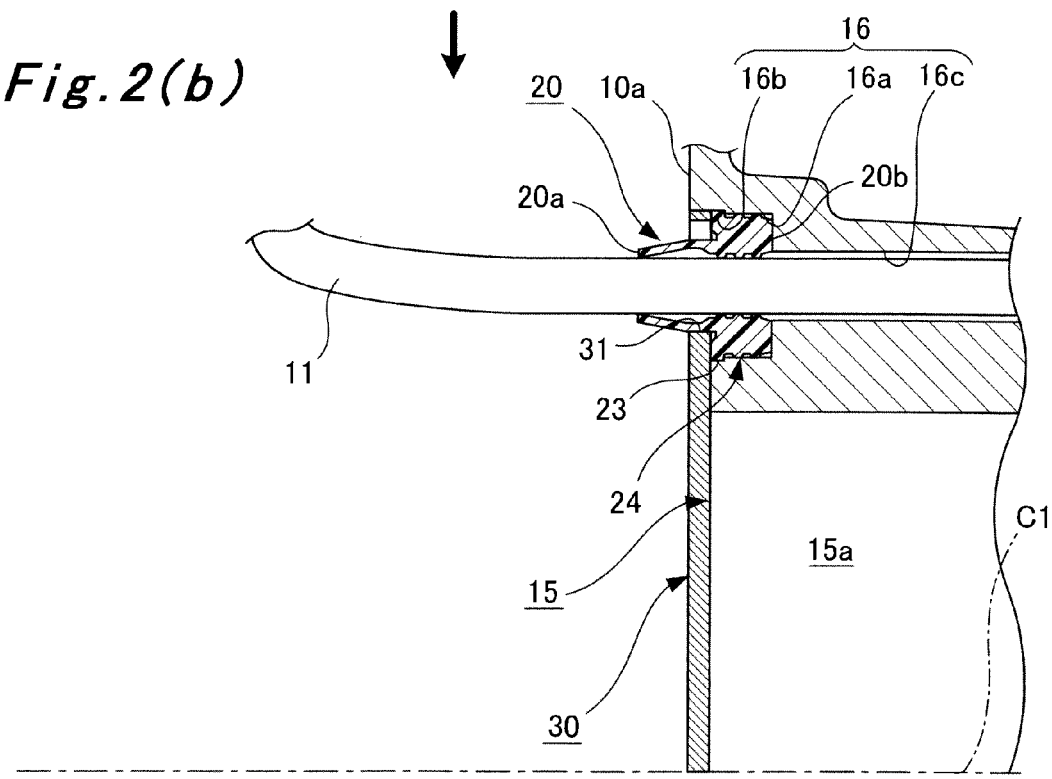

At the one end 10a of the housing 10, there is provided a recessed housing section 15 (recessed section) for accommodating the first connector 12 attached to the first cable 11a, and the third connector attached to the second cable 11b. The recessed housing section 15 is formed in a closed-bottomed tubular shape recessed inwardly of the housing. As shown in FIGS. 2(a), 2(b), a grommet mounting hole (fixing section) for fixing the grommet 20 thereto is provided in a peripheral wall section 15a of the recessed housing section 15. The grommet mounting hole 16 is shaped to extend in the same direction as the axial direction C1 of the housing 10 and to extend along the peripheral wall section 15a. As shown in FIG. 1, therefore, the grommet 20 of a rectangular parallelepipedal shape can be disposed to face the axial direction C1 of the housing 10. Moreover, the first cable 11a and the second cable 11b can be arranged in a bent state, and the first connector 12 of a rectangular parallelopipedal shape and the third connector of a rectangular parallelopipedal shape can be arranged to head in the diametrical direction of the housing 10. Thus, the first connector 12 and the third connector which are larger than the grommet 20 can be disposed within the recessed housing section 15.

Figure 3:
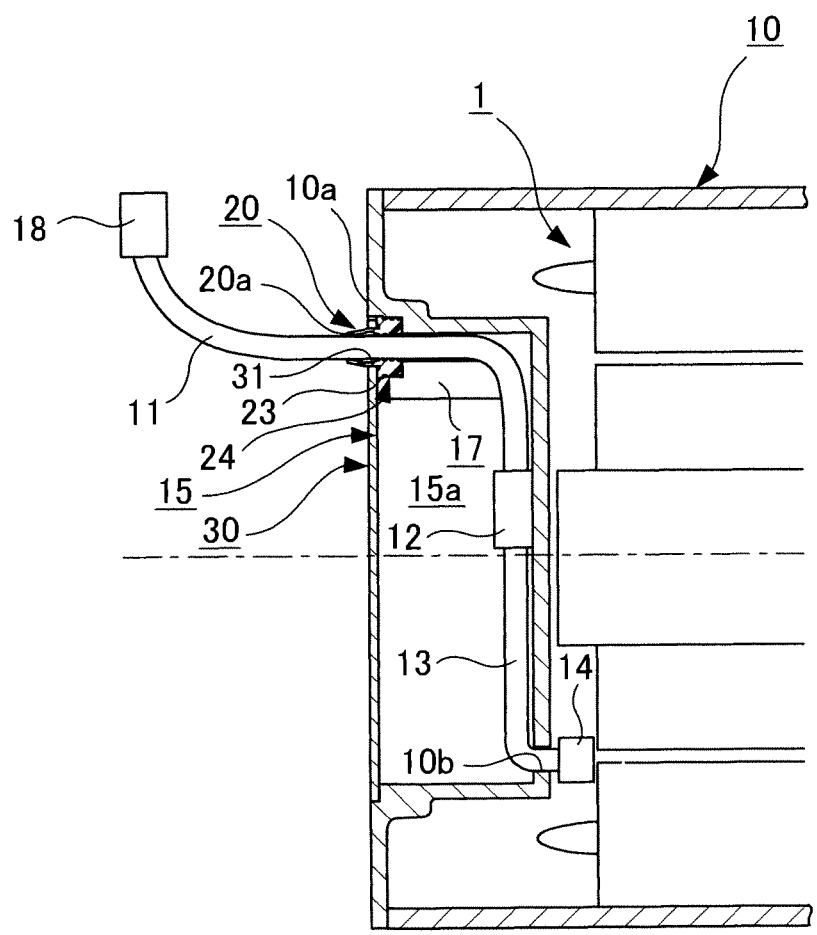
FIG. 3 is a view showing an example of the configuration of the cable mounting structure for an electric apparatus according to the present invention.
Figure 4:
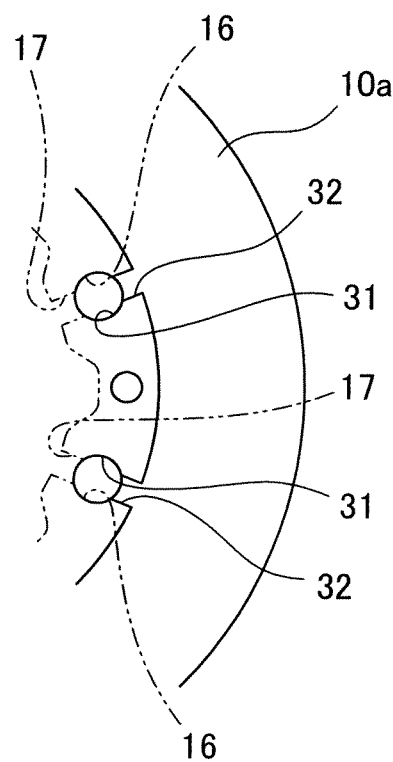
FIG. 4 is a view for illustrating the positions of a communicating portion in a pass-through section of a lid, and a communicating section in a fixing section of a housing.
Figure 5:
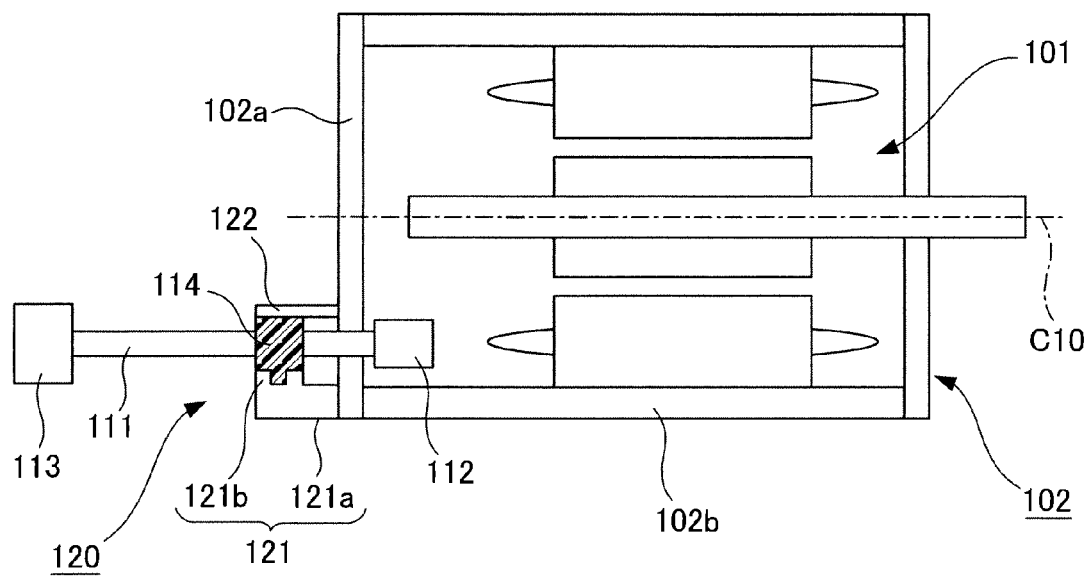
FIG. 5 is a view for illustrating a conventional mounting structure for a cable of an electric apparatus.
Figure 6:
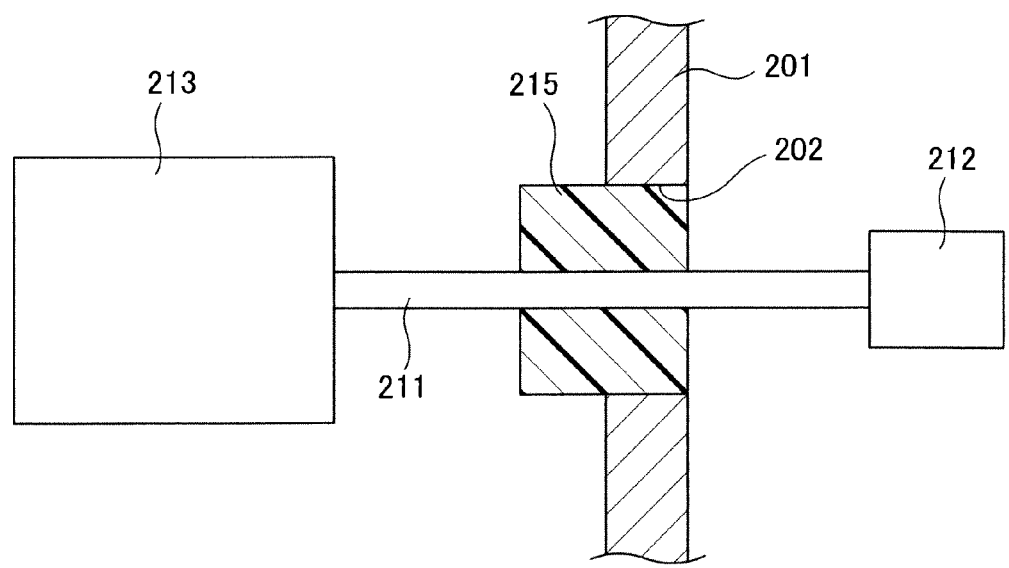
FIG. 6 is a view for illustrating a conventional mounting structure for a cable of an electric apparatus.

The grommet mounting hole 16 is provided with a communicating section 17 for bringing the grommet mounting hole 16 into communication with the recessed housing section 15, as shown in FIGS. 1 and 2. That is, the grommet mounting hole 16 is in a shape communicating with the peripheral wall section 15a of the recessed housing section 15. Thus, the first cable 11a and the second cable 11b can be inserted from the communicating section 17 into the grommet mounting hole 16. The second connector 18 attached to the first cable 11a and the second cable 11b is disposed outside the recessed housing section 15 (outside the housing 10). Hence, the first cable 11a is connected to the electric apparatus body 1 via the first connector 12, and is connected via the second connector 18 to a control device or the power supply which is placed outside the housing 10. For example, a third cable 13 is connected to the first connector 12, as shown in FIG. 3. The third cable 13 is passed through a hole 10b provided in the end 10a of the housing 10, and is connected to a sensor 14 which can be included in a part of the configuration of the electric apparatus body 1 placed within the housing 10. An example of the sensor 14 is a measuring instrument which can measure various data on the electric apparatus body 1, etc. within the housing 10. The second cable 11b is connected to the electric apparatus body 1 via the third connector, and is connected via the second connector 18 to the control device or the power supply which is placed outside the housing 10.

The above-mentioned grommet 20, as shown in FIG. 2(a), is formed in a nearly cylindrical shape (tubular shape) extending along the cable 11, and has a pass-through portion 21 through which the cable 11 is inserted, and a flange portion 23 provided outwardly of the pass-through portion 21 and extending in the diametrical direction. The flange portion 23 is formed at a site nearly intermediate between a leading end 20a and a rear end 20b of the grommet 20. Further, the grommet 20 has a rib portion 24 formed to be nearer to the rear end 20b than to the flange portion 23 and protrude outwardly. The rib portion 24 is formed to be smaller than the flange portion 23 in a diametrical cross section.

The grommet mounting hole 16 is provided with a rib close contact portion 16a which the rib portion 24 of the grommet 20 intimately contacts, and a stepped portion 16b which the flange portion 23 of the grommet 20 is brought into engagement with. A cable pass-through portion 16c is provided in communication with the rib close contact portion 16a of the grommet mounting hole 16, and the cable 11 can be inserted into the cable pass-through portion 16c. The rib close contact portion 16a and the stepped portion 16b are also in communication. Thus, when the grommet 20 is inserted into the grommet mounting hole 16, the rib portion 24 of the grommet 20 contacts the rib close contact portion 16a of the grommet mounting hole 16 to produce a pushing pressure. Thus, the flange portion 23 of the grommet 20 is brought into engagement with the stepped portion 16b, whereby the grommet 20 is fixed in the grommet mounting hole 16, as shown in FIG. 2(b). As a result, the cable 11 fixed to the grommet 20 is also fixed to the housing 10.

On the side of the one end 10a of the housing 10, a stepped section 10b is formed on the outer periphery of the recessed housing section 15, as shown in FIG. 1. An edge 30a of a lid 30 is positioned at the stepped section 10b to close the recessed housing section 15. The lid 30 is fixed to the one end 10a of the housing 10 by fixtures 33 such as bolts. The lid 30 is provided with pass-through sections 31 which are located in the grommet mounting holes 16 provided in the housing 10 when the lid 30 is positioned at the fixing position of the housing 10, and through which the first cable 11a and the second cable 11b are passed. Concretely, the pass-through section 31 is provided to be inscribed in the edge 30a of the lid 30, and the pass-through section 31 is provided with a communicating portion 32 which allows the pass-through section 31 to communicate with the edge 30a of the lid 30, as shown in FIG. 1. The communicating portion 32 is formed to be smaller in a diametrical cross section than the flange portion 23 of the grommet 20. Thus, the first cable 11a, the second cable 11b, and the leading end 20a of the grommet 20 can be inserted through the communicating portion 32 into the pass-through section 31. With the grommet 20 being mounted in the grommet mounting hole 16 of the housing 10, the pass-through section 31 of the lid 30 is positioned at the flange portion 23 of the grommet 20, and fixed to the one end 10a of the housing 10 by the fixture 33. By so fixing the grommet 30 to the housing 10 by the lid 30, a pushing pressure occurs at the flange portion 23.

In the diametrical cross section, therefore, the communicating section 17 of the grommet mounting hole 16 and the communicating portion 32 of the lid 30 are arranged in offset relationship, so that the sealing properties, such as waterproof properties and dustproof properties, of the interior of the recessed housing section 15 are improved. That is, the offset refers to a state in which the communicating section 17 of the grommet mounting hole 16 and the communicating portion 32 in the pass-through section 31 of the lid 30 are displaced with respect to each other in the diametrical direction.

The flange portion 23 and rib portion 24 of the grommet 20 may be coated with a liquid sealing material (e.g., silicone sealing material), whereby the waterproof properties can be further enhanced.

The cable mounting structure for an electric apparatus according to the present embodiment, as noted above, comprises the housing 10, the first cable 11a and the second cable 11b connected to the electric apparatus body 1 via the first connector 12 and the third connector, and the lid 30 for closing the recessed housing section 15 provided in the housing 10. The recessed housing section 15 is formed in a closed-bottomed tubular shape recessed inwardly of the housing. The grommet mounting holes 16 for fixing the grommets 20 mounted on the first cable 11a and the second cable 11b are provided in the peripheral wall section 15a of the recessed housing section 15. The pass-through sections 31 through which the first cable 11a and the second cable 11b pass are formed in the lid 30. The grommet 20 is fixed in the grommet mounting hole 16, while the first connector 12 and the third connector are placed within the recessed housing section 15, and the pass-through section 31 is positioned to the grommet 20. Simply by closing the recessed housing section 15 with the lid 30, therefore, the sealing properties such as waterproof properties and dustproof properties can be ensured. Regardless of the size of the pass-through section 31, the first connector 12 and the third connector can be disposed within the recessed housing section 15, and restrictions on the sizes of the first connector 12 and the third connection can be eased. Furthermore, the grommet 20, the first connector 12 and the third connector can be disposed within the recessed housing section 15 of the housing 11. In addition, the grommet 20, the first connector 12 and the third connector can be arranged within the recessed housing section 15 of the housing 10, without being disposed on the same straight line. Thus, the configuration in the present embodiment can effectively contribute to downsizing.

The above descriptions have been offered using the cable mounting structure for an electric apparatus which accommodates the electric rotating machine, as the electric apparatus body 1, within the housing 10. However, the present invention can be applied to the cable mounting structure for an electric apparatus which accommodates a converter or the like, instead of a motor, within a housing.

Explanations have been offered using the cable mounting structure for an electric apparatus in which the cable 11 having one end divided in two, i.e., the first cable 11a and the second cable 11b, is mounted on the one end 10a of the housing 10. However, the cable mounting structure for an electric apparatus may be one which has one cable or many cables mounted on the one end of the housing.

The present embodiment has been described using the cable mounting structure for an electric apparatus in which the first connector 12 is connected to the sensor 14 disposed within the housing 10 via the third cable 13. However, the present invention can be applied to the cable mounting structure for an electric apparatus which is connected to a connector disposed within the housing 10 and connectable to the electric apparatus body 1, instead of being connected to the sensor 14. By so doing, the first cable 11a can be connected to the electric apparatus body 1 within the housing 10.

INDUSTRIAL APPLICABILITY

The cable mounting structure for an electric apparatus ensures sealing properties, such as waterproof properties and dustproof properties, and can effectively contribute to downsizing, while easing restrictions on the size of the connecting tool mounted on one end of the cable connected to the electric apparatus body. Hence, the cable mounting structure can be utilized very advantageously in the electric machinery and apparatus industry and so on.

DESCRIPTION OF THE NUMERALS

1 Electric apparatus body
10 Housing
11 Cable
11a First cable
11b Second cable
12 First connector
15 Recessed housing section
15a Peripheral wall section
16 Grommet mounting hole
17 Communicating section
18 Second connector
20 Grommet
23 Flange portion
24 Rib portion
30 Lid
31 Pass-through section
32 Communicating portion

The invention claimed is:

1. A cable mounting structure for an electric apparatus, comprising a housing for accommodating an electric apparatus body, a cable connected to the electric apparatus body via a connecting tool, a grommet mounted on the cable, a recessed section provided in the housing, and a lid for closing the recessed section,
wherein the recessed section is formed in a closed-bottomed tubular shape recessed inwardly of an external side of a housing wall, a fixing section for fixing the grommet thereto is provided in a peripheral wall section of the recessed section, and a pass-through section through which the cable is passed is provided in the lid, and
the connecting tool is disposed within the recessed section, and the pass-through section is positioned to the grommet.

2. The cable mounting structure for an electric apparatus according to claim 1, wherein
the pass-through section has a communicating portion communicating with an edge of the lid, and
the fixing section has a communicating section communicating with the peripheral wall section of the recessed section.

3. The cable mounting structure for an electric apparatus according to claim 2, wherein
the communicating portion in the pass-through section and the communicating section in the fixing section are formed to be offset with respect to each other.

4. The cable mounting structure for an electric apparatus according to claim wherein
the grommet is formed in a shape extending along the cable, and includes:
a flange portion provided on an outer side of an intermediate site between a leading end and a rear end of the grommet, and a rib portion situated nearer to the rear end than the flange portion, protruding outwardly, and
wherein the flange portion and the rib portion are connected.

5. The cable mounting structure for an electric apparatus according to claim 4, wherein
the rib portion is formed to be smaller than the flange portion in the diametrical cross section.

6. The cable mounting structure for an electric apparatus according to claim 5, wherein
the fixing section includes:
a rib close contact portion which the rib portion of the grommet intimately contacts; and a stepped portion which the flange portion of the grommet is brought into engagement with, the rib close contact portion and the stepped portion being in communication, and
when the cable is connected to the electric apparatus body, the grommet is inserted into the fixing section, and the grommet is fixed to the fixing section with the rib portion of the grommet brought into contact with the rib close contact portion of the fixing section, and with the flange portion of the grommet brought into engagement with the stepped portion of the fixing section.

7. The cable mounting structure for an electric apparatus according to claim 6, wherein
the communicating portion in the pass-through section and the communicating section in the fixing section are formed to be offset with respect to each other.

8. A cable mounting structure for an electric apparatus, comprising a housing for accommodating an electric apparatus body, a cable connected to the electric apparatus body via a connecting tool, a grommet mounted on the cable, a recessed section provided in the housing, and a lid for closing the recessed section,
wherein the recessed section is formed in a closed-bottomed tubular shape recessed inwardly of an external side of a housing wall, a fixing section for fixing the grommet thereto is provided in a peripheral wall section of the recessed section, and a pass-through section through which the cable is passed is provided in the lid, the grommet is formed in a shape extending along a cable, and includes:
a flange portion provided on an outer side of an intermediate site between a leading end and a rear end of the grommet, and extending in a diametrical direction;
and a rib portion situated nearer to the rear end than the flange portion is, protruding outwardly, and formed to be smaller than the flange portion in the diametrical cross section,
the pass-through section has a communicating portion communicating with an edge of the lid, the fixing section has a communicating section communicating with the peripheral wall section of the recessed section, and includes:
a rib close contact portion which the rib portion of the grommet intimately contacts;
and a stepped portion which the flange portion of the grommet is brought into engagement with, the rib close contact portion and the stepped portion being in communication, and when the cable is connected to the electric apparatus body, the grommet is inserted into the fixing section, and the grommet is fixed to the fixing section with the rib portion of the grommet brought into contact with the rib close contact portion of the fixing section, and with the flange portion of the grommet brought into engagement with the stepped portion of the fixing section, and
the connecting tool is disposed within the recessed section, and the recessed section is closed with the lid by positioning the pass-through section to the grommet.

9. The cable mounting structure for an electric apparatus according to claim 8, wherein
the communicating portion in the pass-through section and the communicating section in the fixing section are formed to be offset with respect to each other.

10. A cable mounting structure for an electric apparatus, comprising a housing for accommodating an electric apparatus body, a cable connected to the electric apparatus body via a connecting tool, a grommet mounted on the cable, a recessed section provided in the housing, and a lid for closing the recessed section,
wherein the recessed section is formed in a closed-bottomed tubular shape recessed inwardly of an external side of a housing wall, a fixing section for fixing the grommet thereto is provided in a peripheral wall section of the recessed section, a pass-through section through which the cable is passed is provided in the lid, and a communicating portion allowing the pass-through section to communicate with an edge of the lid is provided in the lid, the grommet is formed in a shape extending along the cable, and includes:
a flange portion provided on an outer side of an intermediate site between a leading end and a rear end of the grommet, and extending in a diametrical direction;
and a rib portion situated nearer to the rear end than the flange portion is, protruding outwardly, and formed to be smaller than the flange portion in the diametrical cross section, the communicating portion is formed to be smaller in a diametrical cross section than the pass-through section,
the fixing section has a communicating section communicating with the peripheral wall section of the recessed section, and includes:
a rib close contact portion which the rib portion of the grommet intimately contacts;
and a stepped portion which the flange portion of the grommet is brought into engagement with, the rib close contact portion and the stepped portion being in communication, and when the cable is connected to the electric apparatus body, the grommet is inserted into the fixing section, and the grommet is fixed to the fixing section with the rib portion of the grommet brought into contact with the rib close contact portion of the fixing section, and with the flange portion of the grommet brought into engagement with the stepped portion of the fixing section, and
the connecting tool is disposed within the recessed section, and the recessed section is closed with the lid by positioning the pass-through section to the grommet.

* * * * *